United States Patent
Wallenius et al.

(10) Patent No.: US 7,200,385 B1
(45) Date of Patent: Apr. 3, 2007

(54) SELECTION OF SERVICE IMPLEMENTATION

(75) Inventors: Jukka Wallenius, Helsinki (FI); Markku Verkama, Espoo (FI); Sami Uskela, Helsinki (FI); Kimmo Laakkonen, Salo (FI); Sivalingam Kengatharan, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/743,328

(22) PCT Filed: Jul. 13, 1999

(86) PCT No.: PCT/FI99/00622

§ 371 (c)(1),
(2), (4) Date: Apr. 12, 2001

(87) PCT Pub. No.: WO00/04740

PCT Pub. Date: Jan. 27, 2000

(30) Foreign Application Priority Data

Jul. 15, 1998 (FI) ....................................... 981616
Aug. 10, 1998 (FI) ....................................... 981724

(51) Int. Cl.
*H04Q 7/22* (2006.01)
(52) U.S. Cl. ................................ 455/414.1; 455/435.2
(58) Field of Classification Search .. 455/414.1–414.4, 455/418–419, 432.1, 432.3, 435.1, 435.2, 455/558
See application file for complete search history.

(56) References Cited

U.S. PATENT DOCUMENTS 4,908,859 A    3/1990    Bennett et al.
5,267,244 A    11/1993   Messerschmitt et al.
5,774,671 A    6/1998    Satoh
6,101,387 A *  8/2000    Granberg et al. ........... 455/433

FOREIGN PATENT DOCUMENTS

| EP | 0 578 964   | 1/1994  |
| EP | 0 718 783   | 6/1996  |
| EP | 0 825 506   | 2/1998  |
| GB | 2 284 519 A | 6/1995  |
| GB | 2 304 497 A | 3/1997  |
| GB | 2 311 910   | 10/1997 |
| WO | WO 96/13949 | 5/1996  |
| WO | WO 97/07642 | 2/1997  |
| WO | WO 97/50263 | 12/1997 |
| WO | WO 98/28930 | 7/1998  |

OTHER PUBLICATIONS

Wireless Application Protocol forum: WAP WAE, Wireless Application Protocol, wireless Application environment Overview; Apr. 30, 1998, p. 15 paragraph 3.

* cited by examiner

*Primary Examiner*—Lee Nguyen
(74) *Attorney, Agent, or Firm*—Pillsbury Winthrop Shaw Pittman LLP

(57) ABSTRACT

The invention relates to selection of the implementation of a service, and particularly to selection of the implementation of a supplementary service in a mobile communication system, in a situation where a user can use different terminals the properties of which vary. In the solution of the invention, at least two different implementations are defined for a service, the terminal requirements of which differ from each other. The implementation of the service is selected (307, 308, 309, 317, and 318) on the basis of the properties of the terminal used. Thus the implementation of the services is made as optimal and flexible as possible by implementing each service function at the most useful location considering the properties of the terminal and network.

19 Claims, 3 Drawing Sheets

SELECTION OF SERVICE IMPLEMENTATION

BACKGROUND OF THE INVENTION

The invention relates to selection of the implementation of a service, and particularly to selection of the implementation of a supplementary service in a mobile communication system.

Mobile communication systems were developed, because there was a need to allow people to move away from fixed telephone terminals without affecting their reachability. The services offered through the terminal equipment of mobile communication systems have developed along with the systems. At the moment, various new forms of service are being planned for the current and particularly for the future third-generation mobile communication systems, such as Universal Mobile Telecommunication System (UMTS) and International Mobile Telecommunication 2000 (IMT-2000). UMTS is being standardized by ETSI (European Telecommunications Standards Institute), whereas ITU (International Tele-communications Union) is standardizing the IMT-2000 system. These future systems are very similar in basic features. The following will describe in greater detail the UMTS system whose architecture is illustrated in FIG. 1. The basic structure of UMTS comprises an access network (AN) and one or more Core Networks (CN). The mobile terminals (MT) of the users are reached by means of the access network. The core network can be any conventional telecommunications network or a future telecommunications network. The mobile terminal MT can be a simplified terminal for speech only or it can be a terminal for diverse services acting as a service platform and supporting the loading and execution of various functions related to the services.

Like all mobile communication systems, UMTS provides wireless data transmission services for mobile users. The system supports roaming, i.e. UMTS users can be reached and they can make calls anywhere within the UMTS coverage area. UMTS is expected to fulfil the need for a wide range of future services, such as virtual home environment (VHE). With the virtual home environment, a user has access to the same services everywhere within the coverage area of the system. Many of the services required in the future are difficult to even imagine today. The services will become more complex and they will comprise an increasing number of independent functions. It makes more sense to implement some of the services in a way that most of the functions in the service are implemented in the terminal. This way, it is possible to support roaming in particular.

A problem with the above arrangement is that one user may use completely different terminals in different situations and still want to access the same services. All functions cannot be implemented in all terminals. If only the service functions that the simplest model can execute are always implemented in a terminal, the services cannot be implemented in the most efficient way considering the whole range of terminals. If only the service functions that a mid-range terminal can execute are always implemented in a terminal, some of the services are not available in the simplest models, whereas the services could be implemented more efficiently in more complex terminals.

BRIEF DESCRIPTION OF THE INVENTION

The object of the invention is to enable an optimum and flexible implementation of services so that each service function is implemented in the most useful execution environment considering the properties of a terminal and network. This is achieved by a method, system and implementation register characterized by what is disclosed in the independent claims. Preferred embodiments of the method, system and implementation register of the invention are set forth in the dependent claims.

The invention is based on the fact that different versions are defined for each service, and the decision on what service version is used is made on the basis of the properties of the terminal used by the user at each time. This provides the advantage that the user need not remember what services are available in each terminal, because a logic missing from a terminal can be replaced by a service logic in the network. Another advantage is that each service can be implemented per user as advantageously as the terminal allows by utilizing the properties of the terminal as well as possible and by using only the network services that do not exist in the terminal.

In a preferred embodiment of the invention, the version of the service used is always selected in response to change of terminal. This provides the advantage that the version of the service used is in no way bound to the terminal with which it was first selected for the user.

In another preferred embodiment of the invention, the version of the service used is selected on the basis of the properties of the terminal and the network providing the service. This provides the advantage that the various properties of networks can better be taken into consideration and the implementation need not be designed according to the properties of a standard network.

In a further preferred embodiment of the invention, the properties of a terminal are provided in location updating messages. This provides the advantage that new, separate signalling is not necessary and it is possible to make sure that the most suitable version of a service is always selected when the terminal and/or location changes.

In a further preferred embodiment of the invention, the properties of the terminal are queried from the terminal in connection with location updating, when the network makes a location update into the home register or when the terminal has indicated that the USIM card was switched from one terminal to another while power was switched off.

BRIEF DESCRIPTION OF THE DRAWINGS

In the following the invention will be described in greater detail in connection with preferred embodiments and with reference to the attached drawings, in which.

DETAILED DESCRIPTION OF THE INVENTION

The present invention can be applied to any data transmission system in which the properties of only some terminals can be utilized to provide services. Such terminals are being developed, for instance for the next generation of the Global System for Mobile Communication, the GSM 2+. In the following the invention will be described using UMTS as an example without limiting the invention to a certain system, however. The specifications of mobile communication systems in general and of the IMT-2000 and UMTS systems in particular evolve rapidly. This evolution may require extra changes to the invention. Therefore, all terms and expressions should be interpreted as widely as possible and they are intended to describe and not to limit the invention. It is the function that is essential for the invention and not in which network element or apparatus it is executed.

Figure 1:
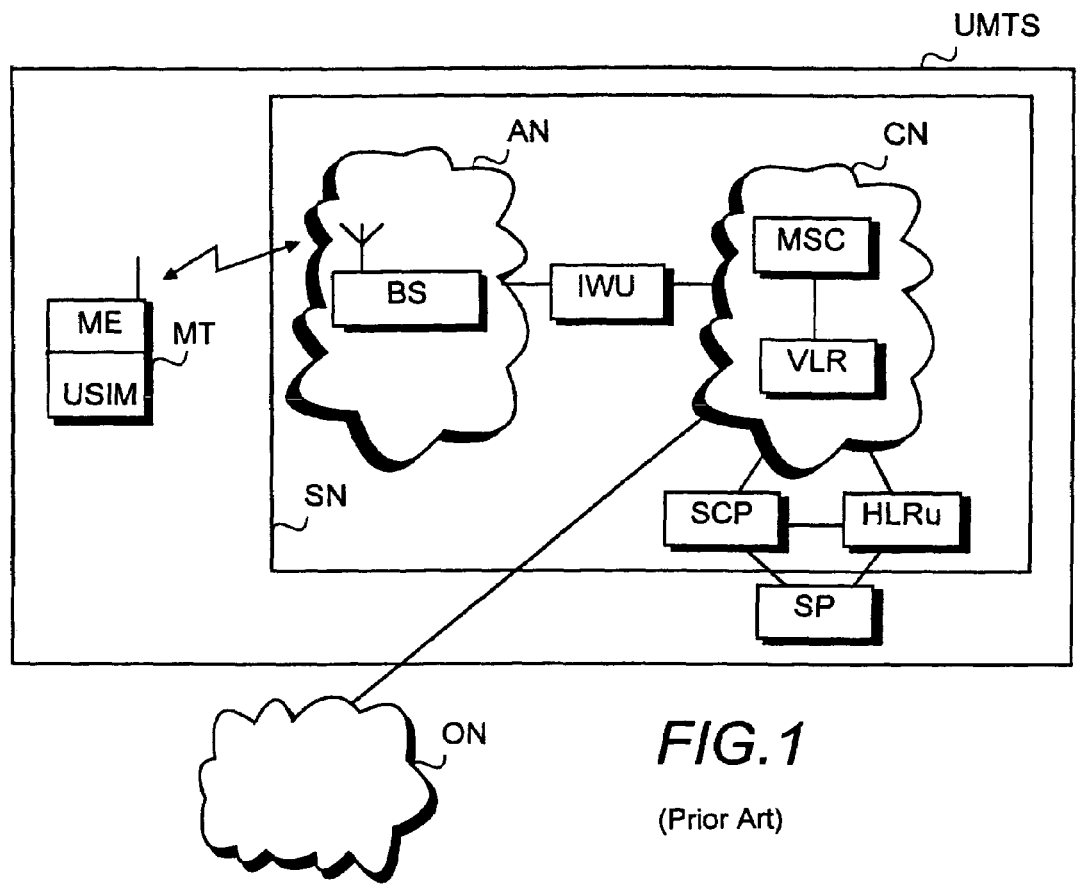
FIG. 1 illustrates the network architecture of the UMTS system.

FIG. 1 shows the network architecture of the UMTS system on a general level, as a more detailed network structure bears no essential significance with regard to the invention. Third-generation mobile communication systems separate a service provider SP and a network operator from each other. A service provider offers services to an end-user through a network SN of one or more network operators. This type of network SN that provides services is called serving network. A service provider can offer services through a serving network SN of one or more network operators. In addition, a service provider may switch to another serving network during the service without the user noticing it. A service provider can also be a network operator.

A serving network SN comprises an actual access network AN, one or more core networks CN, and an interworking unit adapting interfaces IWU for each different core network. According to present knowledge, an access network comprises base stations BS and radio network controllers RNC controlling them. An access network AN is mainly responsible for matters related to radio paths, i.e. it offers core networks the radio access required for wireless operation. A core network CN is any conventional telecommunications network or a future telecommunications network modified to efficiently utilize a core network in wireless communication. Connections to other networks ON are established through a core network CN. Other networks include other UMTS networks, data networks and public switched telephone network.

According to present knowledge, the services of an access network are provided by the core networks CN. In the example presented in FIG. 1, the core network is a network based on the GSM system, in which subscriber services are taken care of at least by a mobile switching centre MSC and a visitor location register VLR. They are the most important network elements with respect to mobility management, control and signalling. A mobile switching centre's task is to switch calls having at least one mobile terminal MT. A mobile switching centre can also include an intelligent network service control function SCF or an interface to one. The SCF controls the functions in order to provide intelligent network services. A visitor location register VLR is usually connected to one mobile switching centre MSC, but it can also serve several centres. Most of the subscriber information concerning a user of a terminal in the home location register HLRu (Home Location Register with UMTS enhancement) is loaded (copied) to the visitor location centre VLR of the mobile switching centre MSC in which area the mobile terminal is. For a more detailed description of the GSM system, refer to "The GSM System for Mobile Communications", M. Mouly and M. Pautet, Palaiseau, France, 1992, ISBN:2-9507190-07-7.

In third-generation mobile communication networks, subscriber and user are separated. The subscriber grants the user access to the subscribed services by giving the user an identification card (IC Card), for instance an USIM card (User and Services and Identity Module). The user accesses the services with a mobile terminal MT which is connected through base stations BS to a serving network SN over a radio path. The subscriber and the user can be one and the same person. In this context, it is assumed for simplicity's sake that the user is also the subscriber.

A mobile terminal MT comprises actual mobile equipment ME and a detachably connected identification card USIM, also called a subscriber identity module. In this context, a mobile terminal MT generally means the entity formed by the subscriber identity module and the actual mobile equipment. The subscriber identity module USIM is a smart card which can be detached from the mobile terminal and with which the subscriber can use the card-controlled mobile terminal. The user is identified by the card in the mobile terminal and not by the mobile equipment itself. According to present knowledge, the USIM card is a multifunctional card and supports mobile communication system applications and other applications, such as Java applications, healthcare applications, etc. The subscriber can subscribe to the services of several different service providers with the same subscriber identity module USIM. According to present knowledge, the subscriber can also have several different service profiles in use for the same subscriber identity module USIM. At least one service profile is required. The subscriber identity module USIM also contains an international mobile subscriber identity IMSI with which the subscriber can be explicitly identified and which can also be used to identify the user. The subscriber identity module USIM can also maintain a list of the services that the user has activated thus making it possible for the USIM card to store data on the different implementation versions of a service for different types of terminals. The USIM card preferably adds to the data of each implementation version the address and instructions with which it can load a service logic from the network in case the actual mobile equipment is changed. If the service logic is based on the browser of the mobile station, for instance a WML-based browser (Wireless Markup Language), and it is integrated to user interface control, the service logic need not be loaded in advance when changing mobile equipment ME, but it can be loaded when the user interface of the service is activated. In such a case, the address of the service logic and the service type stored on the USIM card are used to load the service logic when the user interface of the service is activated. The address of a service logic can be a link to a hypertext page, for instance. Because the identity module is detachable, the subscriber can change the actual mobile equipment and use mobile equipment suitable for each situation.

The actual mobile equipment ME can be a simplified terminal for speech only or it can be a terminal for diverse services containing an execution environment for a service logic of an intelligent network service T-SCF that corresponds to a service control function on the network side. The mobile equipment ME can be any equipment capable of communicating in a mobile communication system or a combination of several pieces of equipment, for instance a multimedia computer to which a Nokia card phone, for instance, has been connected to provide a mobile connection.

The functions of a phone will be controlled using an application programming interface (API). According to present knowledge, a Java-API interface will be used. In this application, the Java-API interface will be used as an example of the API without limiting the invention to this interface type in any way. Thus, the Java-API interface takes care of for instance the control of the terminal functions, such as a possible execution environment of a service T-SCF, call control, mobility management, user interface control, etc. This is done as with CAMEL (Customised Applications for Mobile network Enhanced Logic) in a similar way as in controlling network functions. CAMEL is one of the services in the GSM 2+ phase.

In the example in FIG. 1, the enhanced home location register HLRu is in the serving network SN. According to present knowledge, the enhanced home location register HLRu contains the subscriber and service information required by the UMTS system as well as the core network home location register information. The subscriber service information is maintained according to service profile. Each service profile contains information concerning the telecommunications services subscribed to in the service profile. Telecommunications services include various basic services and supplementary services. A basic service is a general telecommunications service on the basis of which it is possible to offer supplementary services. Telecommunications services included in the basic services can vary according to contract. A supplementary service is a telecommunications service that must be activated separately or ordered from a telecommunications service provider. Supplementary services, such as call waiting and call forwarding, supplement a basic service. Information on the SCF address required to create the service should preferably be added to a supplementary service so that the address can, when necessary, be forwarded to the necessary network elements. The SCF address cannot explicitly be deduced from the service. A service provider may have several different SCF addresses for the same service and only one of these is available for a user. Additionally, several service providers can offer the same service and a user usually subscribes to the service of only one of them. According to present knowledge, each service provider SP maintains this information on its services.

In the example in FIG. 1, the service control point SCP is in the serving network SN. The service control point SCP is a service platform on which functions related to the service can be loaded and executed. The service control point SCP can be any network node or network element which contains an intelligent network service control function SCF. Each service provider can have their own service control point or several of them. The service control point SCP of a certain service profile of a certain subscriber is found on the basis of the SCF address. A service control point SCP can also take care of the loading of a service or its function elsewhere in the network and forward service requests from a user to a service provider. In addition, a service control point SCP makes sure, when necessary, that the home network services are also available in visited networks. According to present knowledge, the services are forwarded to the visited networks through the CAMEL application component. The operation of the network is controlled by CAMEL INAP.

The operator of a visited network can bar the forwarding of certain types of operations from a home network or service provider to its own network or their request from the visited network to a home network. The operations can be classified according to use into various types, such as operations affecting tariffs, operations monitoring tariffs, operations restricting conversation time, operations affecting prepaid conversation time, operations related to user interaction, and operations affecting call routing.

A mobile communication system implementing the functionality of the present invention comprises not only means required to implement services according to prior art, but also means to transmit the properties of a terminal to the network, means to maintain the implementation alternatives, i.e. versions, of the services, and means to select the network to be used on the basis of the properties of the terminal of the user. In addition, the system may comprise means to take into account the properties of the serving network when selecting the service versions to be used. Further, the system may comprise means to take into account the operation types allowed between the home network and the visited network when selecting the implementation of the services.

Figure 2:
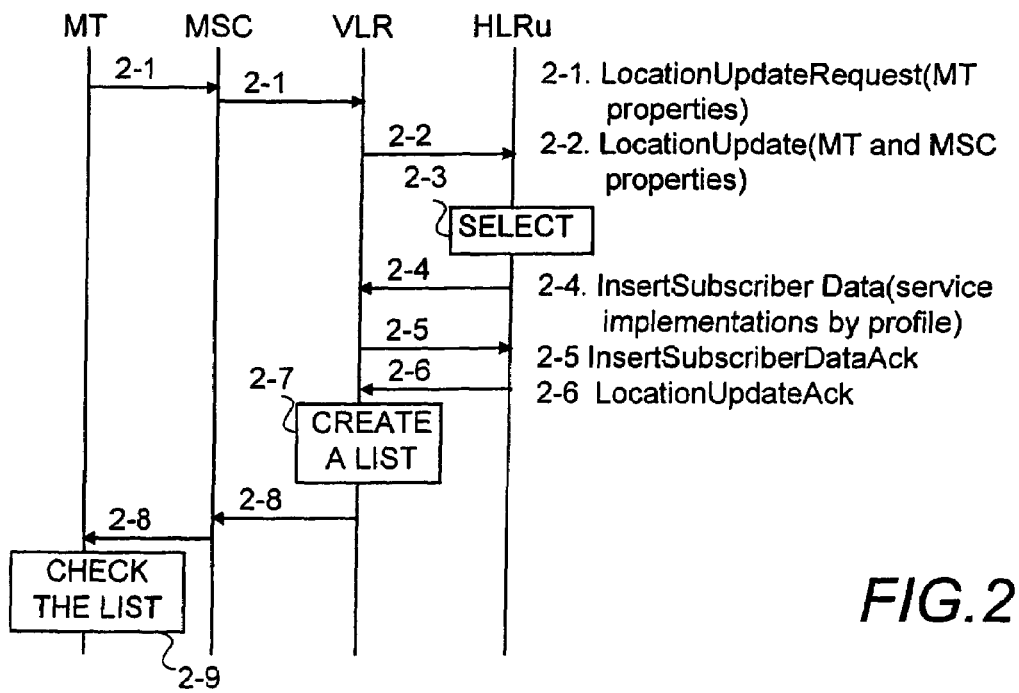
FIG. 2 shows the signalling of the first preferred embodiment of the invention.

FIG. 2 shows the signalling of the first preferred embodiment of the invention. For simplicity's sake, it is assumed in the first preferred embodiment that the core network is a GSM network. However, the invention is not in any way dependent on the data transmission system used in the core network. In the first preferred embodiment, the optimization of the implementation of services, i.e. the selection of the implementations used at a given time, is preferably done in the home location register HLRu in connection with location updating. Selecting the implementation of the services in connection with location updating and prior to transmitting subscriber information from the home location register HLRu to the visitor location register VLR provides the advantage that changes to existing network elements are small. Location updating is performed at least when the location changes or when power is switched on to a terminal that has been switched off. Normally, location updating is performed in the visitor location register VLR, when a terminal remains in the same visitor location register. A terminal can also ask for location updating into the home register. Without any separate action, selection of implementation is always made when the serving network changes. The first preferred embodiment of the invention makes sure that the selection of implementation is always made by means of a handshake between the USIM card and the mobile equipment ME when the terminal changes. The handshake is always performed when power is switched on. The handshake shows if the mobile equipment ME has changed. Information concerning the latest USIM card used can be stored in the mobile equipment ME, or information concerning the latest mobile equipment used can be stored on the USIM card. If the handshake shows that the USIM card is no longer in the same mobile equipment ME as before the power was switched off, the USIM card checks the properties of the mobile equipment ME (for instance the version of the API), after which the mobile terminal MT requests location updating into the home location register HLRu. The solution of the first preferred embodiment provides the advantage that the selection of implementation is always performed only when essential changes occur. The invention is, however, in no way bound to the location updating messages, but the information can also be sent in other messages. In addition, the information need not be sent in connection with each location update, but they can be sent for instance only in connection with location registration and/or always when power has been switched off in the terminal. Selection of implementation can also be performed elsewhere than in the home location register, for instance in the mobile terminal MT or visitor location register VLR. Selecting the implementation in the home location register HLRu provides the advantage that the property is readily available with different core networks. The essential point is that the necessary information is transmitted to where the selection is made, at least when the user changes the terminal or the serving network is changed.

In FIG. 2, the mobile terminal MT sends a message 2-1 (LocationUpdateRequest) requesting location update to the mobile switching centre MSC which forwards it on to its visitor location register VLR. In addition to ordinary information, the message 2-1 indicates the properties of the mobile terminal. In an embodiment of the invention, the properties of a terminal are not transmitted in the location update message itself, but the visitor location register asks for them in a separate inquiry message to which the mobile terminal MT answers before location updating can continue. At their simplest, the properties can be just a class identifier of the terminal. However, the properties of a terminal preferably contain information concerning for instance the version of the service execution environment T-SCF, the functions loaded from the network to the terminal or USIM card, the version of the Java API and its extensions in the terminal, etc. This information facilitates the analysis of the properties of the terminal. Analysing only the class of the terminal necessitates that more detailed information on the content of the class exists somewhere in the network.

After receiving the message 2-1 requesting location update, the visitor location register notices that the location update must be made into the home location register HLRu, because either the terminal has asked for it or the terminal is unknown to the visitor location register. In an embodiment of the invention, after the visitor location register notices that the location update must be made into the home location register, the visitor location register requests the properties of the terminal from it. This provides the advantage that the size of the location update messages does not grow too much. VLR adds information indicating the properties of the serving network to the message 2-2 requesting location update and sent to the home network. When the core network is a GSM network, the properties of the network are the same as those of the mobile switching centre. In addition, the visitor location centre can add to the message information indicating the properties available via the serving network, i.e. the mobile switching centre. If the location update is made from the visited network to the home network, in the first preferred embodiment of the invention, the visitor location register also adds to the message information on the operation types allowed between the home network and the visited network. The visitor location register obtains this information through the home network code, for instance. In core networks, in which the properties of switching centres differ, selection of implementation can be made per switching centre. This can be done by giving the properties of the switching centre serving the terminal and the properties available through it as the network properties and by adapting the visitor location register to regard the mobile terminal changing network area as unknown. When the visitor location register VLR has made the additions, it sends the location update message 2-2 (LocationUpdate) to the home location register HLRu. As described above, the location update message contains in addition to the ordinary information at least information indicating the properties of the terminal and mobile switching centre. In an embodiment where handshaking is not used in the terminal, the visitor location register can maintain the properties of the subscriber's terminal in its subscriber information and prior to creating the message 2-2 check if the properties of the terminal are the same or if the terminal has stayed under the same switching centre, and if nothing has changed from before, the visitor location register does not create the message 2-2.

When the home location register HLRu has received the message 2-2, it selects the implementations of the subscriber's services in step 2-3. This selection is described in greater detail in connection with FIG. 3. In one embodiment, the home location register does not receive the properties of the terminal or network used by the subscriber in the message 2-2, but has to ask the properties of the terminal through the visitor location register and mobile switching centre from the terminal and the network properties from the visitor location register. This provides the advantage that the properties of the terminal are not forwarded unnecessarily in location update signalling and the home location register HLRu only asks for the properties of the terminal and network if in the information concerning service implementations defined in the service profiles of the subscriber in the home location register HLRu include definitions of properties required of the terminal or network and these will be needed in step 2-3. In one embodiment, the home location register can maintain in its subscriber information the properties of the terminal and network used by the subscriber, and prior to selecting the implementation it can check, if the properties are the same, and if nothing has changed, the selection is not made again. When the implementations have been selected, i.e. step 2-3 has been completed, the HLRu sends to the visitor location register VLR a message 2-4 (InsertSubscriberData) containing the subscriber information. In addition to the ordinary information, this message contains the implementations of the services, i.e. the version of each service by service profile. It preferably also contains information on the services that cannot be implemented in this environment with this terminal. After the visitor location register VLR acknowledges the subscriber information with a message 2-5 (InsertSubscriberDataAck), the HLRu sends a location registration acknowledgement message 2-6 (LocationUpdateAck). In some preferred embodiments of the invention, the service profile information of the message 2-4 contains information on the operation types required by the services at least when the service profiles are being transmitted from the home network to a visited network.

In the first preferred embodiment of the invention, when the visitor location register VLR has received the message 2-6, it creates a list of the available services on the basis of the service profile information in the message 2-4 in step 2-7. The available services include those that the user has activated in this environment with this terminal. The services that are fully implemented in the terminal can be left out of the message 2-4, or the message can include only the information that these are supported. If the VLR is in a visited network, it can, if necessary, preferably send the service profile(s) to the service control point SCP of its own network before creating the list. In this case, SCP checks, if it is possible to establish a connection between the visited network and the service providers mentioned in the service profile(s). The check is made on the basis of the address of each service provider. If a connection cannot be established, the services of the service provider are deleted from the list. In the embodiments where the message 2-4 also contains information on the operation types required by the services, the SCP of the visited network can check, if the use of the required operation types is allowed between the service provider and the visited network. Alternatively, the visitor location register VLR can make the check. If one of the operation types required by a service is not allowed, the service is not added to the service list. The visitor location register VLR sends the service list to the mobile terminal MT in the location update acceptance message 2-8 (LocationUpdateAccepted).

Having received the message 2-8, the terminal checks the services available in the current environment from the list in step 2-9. If the terminal contains a service execution environment T-SCF, the list containing the services can be forwarded to it. The service execution environment can present the information on the list to the user in a customized way. The USIM card in the terminal always stores the user interface by user profile when a service requires a specific user interface. The user interface of one service, for instance a weather report, can be either a graphical, text or audio presentation depending on the properties of the actual mobile equipment ME. If the location update was caused by the fact that the USIM card was installed in a new mobile equipment ME, in the first preferred embodiment of the invention the USIM card initiates, if necessary, the loading of services from the network using for instance the packet data service GRPS (General Packet Radio Service) which is a service of the GSM 2+ stage. In the first preferred embodiment, information on the required services is stored on the USIM card. In the first preferred embodiment of the invention, the USIM card selects the type of the service logic to be loaded on the basis of the properties of the mobile equipment ME and the address to be used in loading on the basis of the type. The addresses are preferably stored on the USIM card for each type of service logic of each service. The service can also always be loaded from the same address, but then the type of the service logic must be provided to the server during loading. When the services have been loaded, location update can be made again into the home register as described above. Making the location update again provides the advantage that any properties of the mobile terminal changed in connection with loading (for instance finding a service logic required by a service in the terminal after the loading) can be taken into consideration and the service implementations can be selected taking into consideration the logic loaded into the terminal. Location update and selection of service implementation can always be performed again when a new property is loaded into the terminal. On the other hand, if the service logic is based on the browser of the mobile station, and it is immediate user interaction by nature, for instance activation of functions on the basis of user input, the service logic need not be loaded beforehand when changing the mobile equipment and location update with a new selection of service implementation is not necessary.

When a service is activated, information on the implementation is preferably transmitted to the service control point SCP containing the service control function using for instance the CAMEL CAP protocol and particularly the messages InitialDP and EventReportPCS. These messages transmit advantageously information on the terminal properties to the service control function.

The signalling messages described above in connection with FIG. 2 are for reference only and can contain several separate messages to transmit the same information. In addition, the messages may contain other information. Other signalling messages can also be used or separate signalling made to transmit the information. Depending on the operator and system (and the core network of the system), also other network elements to which different functionalities have been distributed can participate in data transmission and signalling. All network elements shown in the figure need not participate in signalling, if data transmission is done via another route.

Figure 3:
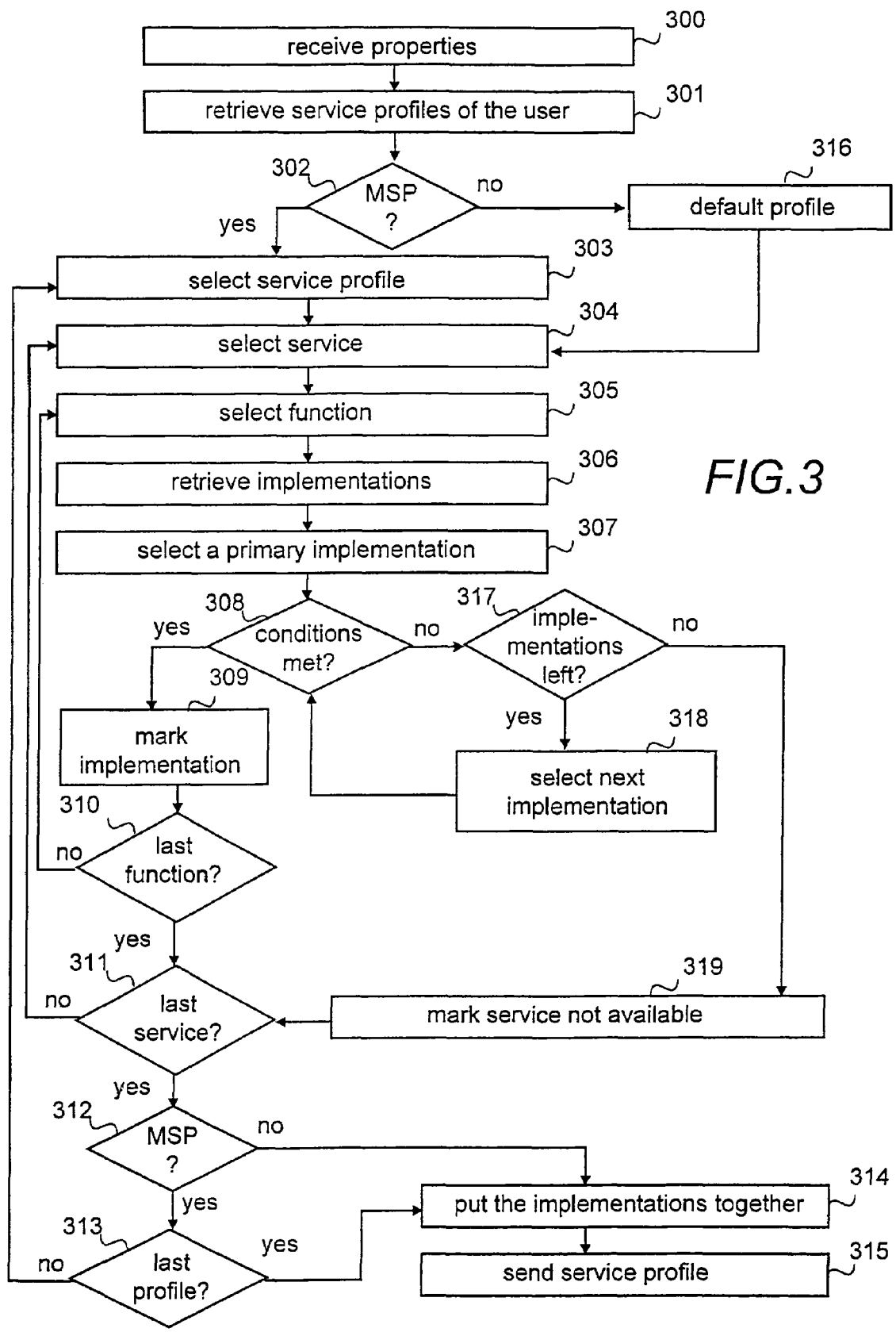
FIG. 3 shows a flow chart of the selection of the implementation of service functions according to the first preferred embodiment of the invention.

FIG. 3 shows a flow chart describing the selection of service implementation in the first preferred embodiment. In the first preferred embodiment the implementation of an individual service is optimized by selecting the best possible implementation version for each service function. Additionally, it is assumed that the user has several service profiles.

In the first preferred embodiment, the selection of service implementation begins by receiving the properties of the terminal and mobile switching centre in step 300. In addition, in the first preferred embodiment, information on the operation types allowed in the visited network can be received in step 300. This information is received for instance in the message 2-2 of FIG. 2, which also contains information concerning the user. The properties of a mobile switching centre will later in connection with the description of FIG. 3 be referred to as network properties. Next, in step 301, the service profiles of the user including their information are retrieved. After this, in step 302, it is checked whether the network supports multiple subscriber profiles MSP. This provides the advantage that if the network does not support MSP, the selection of service implementation is not unnecessarily made for all service profiles. If the network supports MSP, the service profile whose service implementations are decided on first is selected in step 303. The simplest way is to start with the first service profile. The simplest way to decide on service implementation is to do it by service profile, as the same service may have been ordered from different service providers in different profiles.

After the service profile is selected in step 303, the services of the profile are processed one service at a time. In step 304, the service is selected and its selection of implementation is started in step 305 by selecting the service function. After this, in step 306, the implementation versions of the function, i.e. a list of the alternative implementations of the function in this profile for this user, and the minimum properties of the terminal and network required by each implementation are retrieved. Additionally, in the first preferred embodiment, also the operation types for each implementation required between the visited network and the home network can be retrieved. This list is described in greater detail later in connection with FIG. 4. In step 307, a primary implementation version is selected from the list, and next, in step 308, it is checked if the terminal and network meet the conditions set on this implementation version. If the network is a visited network, the check also includes checking if all necessary operation types are allowed. If the conditions are met, the next step is step 309 in which the function and its implementation version are combined. After this, in step 310, it is checked if the function is the last function in this service, for which an implementation version must be selected. If the function is the last (or only) one, the next step is step 311 in which it is checked if an implementation has already been selected for all the services in the service profile, i.e. if this is the last of the services. If it is, in step 312, it is checked if the network supports multiple subscriber profiles MSP. If the network supports MSP, in step 313, it is checked if all service profiles have been taken care of, i.e. is this the last of the service profiles. If the service profile is the last one, the message 2-4 shown in FIG. 2 is put together in step 314 by inserting in the message the implementation of each service by service profile, for instance by giving the version number of the implementation, the address of the service control point to be possibly used, information on the activation of the service, i.e. where the information on the call state model, location update state model, package data session state model, short message processing or supplementary service activation detection point(s) can be found and with which conditions the enquiry of the service control point is made. In the preceding sentence, location updating refers to the fact that a service needs for instance the location information by location area of the mobile terminal from the visitor location register. The state model information contains information on the necessary control points. The correct service can only be found in the service control point on the basis of the service identity information (version number of the implementation and/or type of the terminal, for instance) and the address of the service control point. One control point may contain several services and/or service versions. Additionally, the services that possibly cannot be provided or cannot be provided, because the visited network does not allow a required operation type, are marked by service profile. The services whose implementation does not cause any action in the network, because the action is performed in the terminal, can be indicated by transmitting information that the service is supported, or, alternatively, the service is not mentioned at all, as the terminal will recognise the service as one of its own. Next, in step 315, the service profiles with their information are sent to the visitor location register. In one embodiment of the invention, information on only those services that are not available is sent. In an embodiment in which the home location register does not check the operation types, service-specific information on the operation type required by the service can be sent to the service profiles in the visitor location register of a visited network.

If in step 302, it is detected that the network does not support multiple subscriber profiles MSP, operation continues from step 316 in which a default profile provided by the subscriber for situations like this is selected as the service profile whose service implementation is to be optimized, i.e. the implementation versions are selected. From step 316, the operation moves to step 304 to select the service in the profile, and from there operation continues as described above.

The check in step 302 is not absolutely necessary and the service implementations of all profiles can be optimized even though the network does not support MSP. This is, however, unnecessary work. If the check in step 302 is not made then the check in step 312 is also unnecessary.

If in step 308, it is detected that one of the conditions of implementation is not met, i.e. the properties of the mobile terminal or network are not as required or the visited network does not allow the necessary operation type, operation continues from step 317 in which it is checked if there are any implementation versions left. If there are, the best implementation available is selected in step 318, after which operation continues from step 308.

If in step 317, it is detected that the implementation version was the last one, in step 319, it is indicated that the service is not available. Next, the operation moves to step 311 to check if the service was the last one. The fact that other functions of the service are not checked is due to the assumption in the first preferred embodiment that a service is not available when one of its functions cannot be implemented. In other embodiments, this does not necessarily apply.

If in step 310, it is detected that the function was not the last in the service, the operation moves to step 305 to select the next function for which implementation is selected. This loop is iterated until an implementation is selected for all functions of a service or a function cannot be implemented.

If in step 311, it is detected that the service is not the last one, the operation moves to step 304 to select the next service and then the implementations for its functions. This loop is iterated until implementations exist for all services in a service profile or information exists that the service is not available.

If in step 312, it is detected that the network does not support MSP, operation continues from step 314 in which only the service implementations of the default service profile are collected.

If in step 313, it is detected that there are more service profiles whose service implementations have not been selected, operation continues from step 303 in which the next service profile is selected and then its service implementations are optimized. This loop is iterated until all service profiles have been processed.

The steps shown in FIG. 3 are not in an absolutely chronological order and some of the steps can be performed simultaneously or deviating from the given order. Other functions can also be executed between the steps and some of the steps can be left out. In an embodiment in which a service is not divided into separate functions, steps 305, 310, 317 and 318 are left out and steps 306, 307 and 309 are directed to the different implementation versions of a service, and from step 308 operation continues to step 309 or 319. The essential thing is that the conditions of implementation are compared with the properties and the optimum solution is selected on the basis of them.

Figure 4:
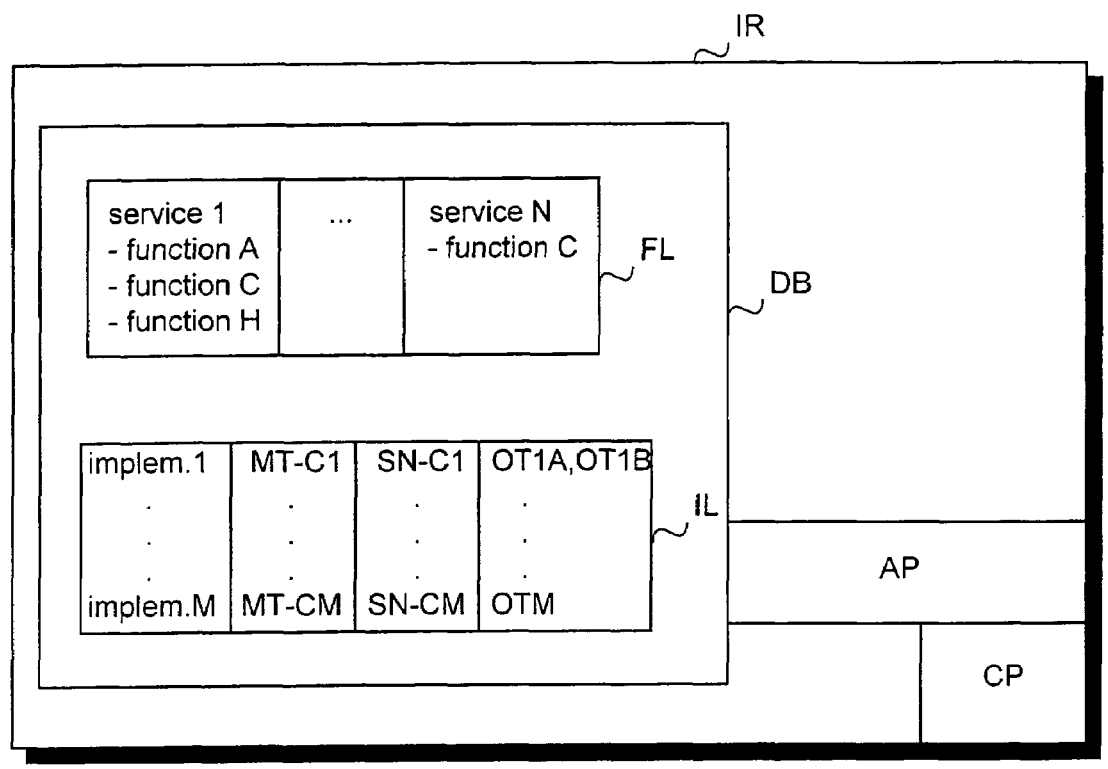
FIG. 4 is a block diagram of the implementation register of the first preferred embodiment of the invention.

FIG. 4 shows a block diagram of an implementation register IR of the invention. The implementation register is preferably integrated into an existing register, such as the home register in the first preferred embodiment. In other embodiments, the implementation register may comprise functions distributed in various units. The implementation register can also be implemented as a separate network element or an entity formed by several network elements. Each service provider can have its own implementation register, for instance. The implementation register IR comprises a database part DB, an application part AP and possibly a connection part CP.

In the first preferred embodiment, the database part DB contains at least one function list FL for each service provider and an implementation list IL for each function. The function list FL lists the functions included in each service provided by each service provider. In the example in FIG. 4, service 1 comprises three functions and service N one function. An example of a service comprising several separate functions is call completion to busy subscriber (CCBS) which includes activation, monitoring, free indication, queuing and recall. The implementation list IL lists the alternative implementations of a function preferably so that the best implementation version implementation 1 is first and the worst version implementation M is last. Each implementation includes the properties required of the terminal, the properties required of the serving network and advantageously the required operation types. In the example in FIG. 4, implementation 1 requires at least MT-C1 properties in the terminal, at least SN-C1 properties in the serving network, and OT1A and OT1B operation types. Correspondingly, implementation M requires at least MT-CM properties in the mobile terminal, at least SN-CM properties in the serving network and OTM operation type. The first implementation alternative can be, for instance, that the function is implemented in the network as a normal service assuming that the terminal has a service logic execution environment T-SCF. In such a case, the network only needs to have the basic properties and the implementation of the service does not cause intelligent network action in the network. The last implementation alternative can be that the function is completely implemented as an intelligent network service of the network, when the terminal is the simplest basic model, assuming that the serving network has a connection to the intelligent network control point SCP or the mobile switching centre includes an intelligent network control function. The above-mentioned intelligent network control function must be a CAMEL execution environment (CSE, CAMEL Service Execution Environment). The last implementation can also be replacing the service with a standard GSM service. Outgoing call barring that is usually implemented as an intelligent network service can, for instance, be implemented as a conventional GSM service, when a dumb terminal is used and the network does not support CAMEL. In such a case, the information that the service is a more simplified GSM service can be passed on to the visitor location register and the terminal. Information on whether the implemented version is the best version or a default version, or information on the level of the selected implementation, or any essential information concerning the selected implementation independent of the level of the terminal can also be passed on to the terminal and/or visitor location register.

The application part AP executes the functions described in connection with FIG. 3, the most essential of which for the invention is the retrieval of the property requirements on the implementation list and their comparison with the properties of the terminal and network used and, if a visited network is used, with the allowed operation types, and the selection of implementation on the basis of the comparison. In the embodiments in which the implementation register is not located where the implementation is selected, the application part can retrieve the functions of the service in question and their alternative implementations and send them to the requesting equipment or network element.

With the connection part CP, the implementation register IR receives and sends messages and information to the network and communicates with the operation and maintenance systems of the network and services. The connection part need not be separate, and, for instance in the first preferred embodiment of the invention, the connection part of the home location register is also the connection part of the implementation register.

The data structures used can differ from the above and data retrieval can be performed in another way. Implementations also need not be function-specific, but can be defined for each service, in which case the implementation lists IL are made for each service and the function list FL is not needed. The required operation types, i.e. the operations that need be allowed between the visited network and home network, can also be stored where the services or functions are. The essential thing is that the database has at least two different implementations for at least one service and each implementation has at least some terminal requirements.

No hardware changes are necessary in the serving network structure, because the implementation register can be integrated into the existing network elements. The serving network comprises processors and memory that can be utilized in the functions of the invention. All changes required to implement the invention can be executed as added or updated software routines in the network elements that contain functions of the invention. An example of such a network element is the visitor location register. Extra memory is required in the network element containing the implementation register.

No hardware changes are necessary in the structure of the terminal. The terminal comprises processors and memory that can be utilized in the functions of the invention. All changes required to implement the invention can be executed as added or updated software routines in the terminal.

Even though the above refers to services in general, only supplementary services in the service profile can be examined and their implementation selected on the basis of the properties of the terminal only or those of the terminal and the serving network. It is also possible to restrict the selection of implementation to relate only to some, more complex services or to situations where the subscriber is visiting the area of the network.

It will be understood that the above description and related figures have merely been presented to illustrate the present invention. It will be obvious to those skilled in the art that various variations and modifications may be made to the invention without departing from the spirit and scope thereof, which is defined by the appended claims.

The invention claimed is:

1. A method for selecting the implementation of a supplementary service in a telecommunications system in which a user can use different terminals the properties of which vary, the method comprising:
   defining at least two alternative implementations for the supplementary service;
   defining, for each implementation, properties required of the terminal; and
   selecting, from among the at least two alternative implementations, an implementation of the supplementary service, the selection being based on the properties of the terminal.

2. The method of claim 1, wherein the selecting of the supplementary service implementation is performed in response to a change of terminal by the user.

3. The method of claim 1, further comprising:
   defining, for each implementation, also properties required of a network providing the supplementary service; and wherein
   the selecting of the implementation of the supplementary service is performed on the basis of the properties of the terminal used and the network it uses.

4. The method of claim 3, wherein the selecting of the supplementary service implementation is performed in response to a change of network used by the terminal.

5. The method of claim 1, wherein the selecting of the supplementary service implementation is performed in response to a new property loaded into the terminal.

6. The method of claim 1, wherein
   the telecommunications system is a mobile communication system,
   the selecting of the supplementary service implementation is performed in connection with location updating, and the method further comprises
   sending necessary information on properties as part of location update signalling.

7. A method for selecting the implementation of a supplementary service in a telecommunications system in which a user can use different terminals the properties of which vary, the method comprising:
   defining functions for supplementary services;
   defining implementations for the functions so that at least one function has at least two alternative implementations;
   defining, for each alternative implementation, properties required of a terminal; and
   selecting an implementation of a supplementary service by selecting, for each supplementary service function having alternative implementations, and implementation based on the properties of the terminal used.

8. The method of claim 7, further comprising
   defining for each implementation properties required of the network providing the supplementary services; and wherein
   selecting the supplementary service implementation is performed by selecting an implementation for each supplementary service function based on the properties of the mobile terminal and network used.

9. A telecommunications system including a network to provide supplementary services to users and terminals the properties of which vary and which the user can freely change, the system comprising:
- memory means including an implementation list for a supplementary service, which list contains at least two alternative implementations for the supplementary service and, for each alternative implementation, properties required of a terminal; and
- selection means to select, from among the at least two alternative implementations, an implementation for the supplementary service, wherein the selection is based on the properties of the terminal used.

10. The system of claim 9, wherein
the implementation list also contains properties required of the network for each alternative implementation, and
the selection means are adapted to take into consideration also the network properties in the selection of the implementation.

11. The system of claim 9, wherein
the memory means contain a function list for at least one supplementary service, in which function list functions for the supplementary service are listed, and at least some of the alternative implementations in the implementation list including their property requirements are defined function-specifically, and
the selection means are adapted to select the supplementary service implementation by selecting an implementation for each function of the supplementary service.

12. The system of claim 9, wherein the selection means are responsive to change of mobile terminal.

13. The system of claim 9, wherein the telecommunications system is a mobile communication system.

14. The system of claim 13, wherein one of the properties of the terminal is a version of the supplementary service execution environment Java-API interface.

15. The system of claim 13, wherein the network includes at least one network node with a supplementary service control function, and the network is adapted to send information on the supplementary service implementation to the service control function when the supplementary service is activated.

16. An implementation register which is part of a telecommunications system, which includes at least one network to provide supplementary services to users, and terminals the properties of which vary and which a user can freely change, wherein the implementation register comprises:
- an implementation list for a supplementary service, which contains definitions of at least two alternative implementations for the supplementary service and, for each alternative implementation, at least properties required of a terminal; and
- an application part configured to retrieve the implementation list for the selection of an implementation from among the at least two alternative implementations for the supplementary service.

17. The implementation register of claim 16, wherein implementation list also contains, for each implementation, definitions of properties required of a network providing the supplementary service.

18. An implementation register which is part of a telecommunications system which includes at least one network to provide supplementary services to users, and mobile terminals the properties of which vary and which a user can freely change, wherein the implementation register comprises:
- a function list which lists at least one function of a supplementary service;
- an implementation list for each function in the function list, which implementation list contains, for at least one function at least two alternative implementations and, for each alternative implementation, at least properties required of a terminal, and
- an application part to retrieve implementation lists of functions for a selection of an implementation from among the at least two alternative implementations.

19. The implementation register of claim 18, wherein the implementation list also contains definitions of properties required of a network providing the supplementary service for each implementation.

* * * * *